(12) United States Patent
Gao (10) Patent No.: US 10,593,333 B2
(45) Date of Patent: Mar. 17, 2020

(54) METHOD AND DEVICE FOR PROCESSING VOICE MESSAGE, TERMINAL AND STORAGE MEDIUM

(71) Applicant: BAIDU ONLINE NETWORK TECHNOLOGY (BEIJING) CO., LTD., Beijing (CN)

(72) Inventor: Cong Gao, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 146 days.

(21) Appl. No.: 15/857,859

(22) Filed: Dec. 29, 2017

(65) Prior Publication Data

US 2019/0005961 A1   Jan. 3, 2019

(30) Foreign Application Priority Data

Jun. 28, 2017   (CN) .......................... 2017 1 0509358

(51) Int. Cl.
*G10L 17/22* (2013.01)
*G10L 17/04* (2013.01)
(Continued)

(52) U.S. Cl.
CPC .......... *G10L 17/04* (2013.01); *G10L 21/0202* (2013.01); *G10L 25/84* (2013.01); *G10L 17/18* (2013.01); *G10L 21/0208* (2013.01)

(58) Field of Classification Search
CPC ......... G10L 17/22; G10L 17/00; G10L 17/02; G10L 17/06; G10L 17/18; G10L 17/20; G10L 17/24; G10L 17/07
(Continued)

(56) References Cited

U.S. PATENT DOCUMENTS 9,665,823 B2 * 5/2017 Saon .................. G06N 3/08
2017/0256254 A1 * 9/2017 Huang ................ G10L 15/02
(Continued)

FOREIGN PATENT DOCUMENTS

CN   101923855   12/2010
CN   106127156   11/2016

OTHER PUBLICATIONS

SIPO, First Office Action for CN Application No. 201710509358.0, dated Dec. 3, 2019.

*Primary Examiner* — Qi Han
(74) *Attorney, Agent, or Firm* — Hodgson Russ LLP (57) ABSTRACT

Embodiments of the present disclosure provide a method and a device for processing a voice message, a terminal and a storage medium. The method includes: receiving a voice message sent by a user, the voice message being obtained based on an unordered version of language interaction; determining a corresponding spectrum of frequency domain feature based on the voice message, and performing a signal processing on the spectrum of frequency domain feature to obtain a first acoustic feature based on frame sequence and corresponding to the spectrum of frequency domain feature; and performing a feature extraction on the first acoustic feature to obtain a second acoustic feature based on an ivector algorithm and a deep convolutional neural network algorithm with residual processing, converting the second acoustic feature into a voiceprint model corresponding to the user, and storing the voiceprint model in a voiceprint model database.

20 Claims, 5 Drawing Sheets

(51) Int. Cl.
*G10L 25/84* (2013.01)
*G10L 21/02* (2013.01)
*G10L 17/18* (2013.01)
*G10L 21/0208* (2013.01)

(58) Field of Classification Search
USPC .............. 704/246, 247, 249, 250, 232, 233
See application file for complete search history.

(56) References Cited

U.S. PATENT DOCUMENTS

2017/0358306 A1\* 12/2017 Xue .................. G10L 15/07
2018/0144242 A1\* 5/2018 Simard ............... G06N 3/084
2018/0358003 A1\* 12/2018 Calle .................. G10L 21/02

\* cited by examiner

METHOD AND DEVICE FOR PROCESSING VOICE MESSAGE, TERMINAL AND STORAGE MEDIUM

CROSS-REFERENCE TO RELATED APPLICATIONS

This application is based on and claims priority to Chinese Patent Application No. 201710509358.0, filed on Jun. 28, 2017, the entire contents of which are incorporated herein by reference.

FIELD

Embodiments of the present disclosure relate to computer technologies, and more particularly to a method and a device for processing a voice message, a terminal and a storage medium.

BACKGROUND

As one biometric recognition technology, the voiceprint recognition is widely applied in terminal devices. The voiceprint refers to frequency spectrum of a voice, which carries language information and can be displayed through an electrical instrument. The frequency spectrum varies with a speaker, such that the unique user can be recognized through the voiceprint.

In the related art, voiceprint recognition methods have defects, and need to be improved.

SUMMARY

Embodiments of the present disclosure provide a method for processing a voice message. The method includes: receiving a voice message sent by a user, the voice message being obtained based on an unordered version of language interaction; determining a corresponding spectrum of frequency domain feature based on the voice message, and performing a signal processing on the spectrum of frequency domain feature to obtain a first acoustic feature based on frame sequence and corresponding to the spectrum of frequency domain feature; and performing a feature extraction on the first acoustic feature to obtain a second acoustic feature based on an ivector algorithm and a deep convolutional neural network algorithm with residual processing, converting the second acoustic feature into a voiceprint model corresponding to the user, and storing the voiceprint model in a voiceprint model database.

Embodiments of the present disclosure provide a terminal. The terminal includes one or more processors and a storage device configured to store one or more programs. When the one or more programs are executed by the one or more processors, the one or more processors implement the above-mentioned method for processing a voice message.

Embodiments of the present disclosure provide a storage medium including computer executable instructions. When the computer executable instructions are executed by a computer processor, the above-mentioned method for processing a voice message is performed.

BRIEF DESCRIPTION OF THE DRAWINGS

Other features, objectives and advantages of the present disclosure will become more apparent from detailed descriptions of non-restrictive embodiments made with reference to the drawings, in which.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Figure 1:
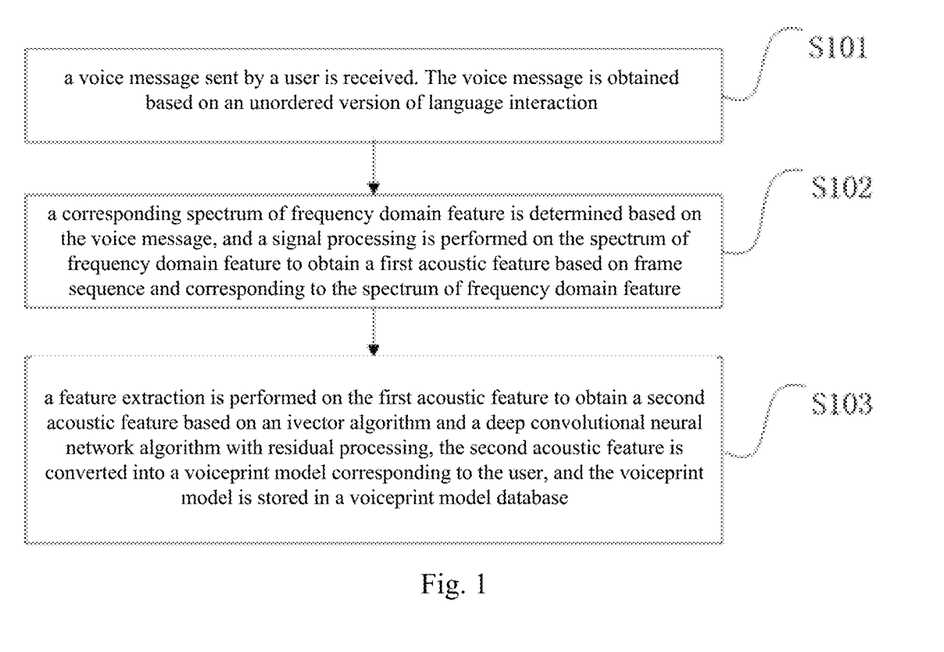
FIG. 1 is a flow chart of a method for processing a voice message according to an embodiment of the present disclosure.

FIG. 1 is a flow chart of a method for processing a voice message according to an embodiment of the present disclosure. The present embodiment realizes efficient and reasonable processing of voices issued by the user. The method can be performed by terminal devices such as a smart phone, a tablet computer and the like. As illustrated in FIG. 1, the solutions provided by the embodiments of the present disclosure include follows.

At block S101, a voice message sent by a user is received. The voice message is obtained based on an unordered version of language interaction.

The unordered version is non-fixed text. In the related art, voiceprint information is registered based on ordered and fixed text. For example, when the user begins registering the voiceprint, the user needs to read the fixed text repeatedly. However, based on subsequent steps of the present solution, registration and recognition of the unordered version (i.e., the non-fixed text) can be achieved. In the present solution, the human-computer interaction is based on the unordered version of language interaction, such that the user experience is increased. For example, the user can complete the voiceprint registration by answering the following three sentences according to speech prompts, such as:

a) Hi, hello, I do not know you yet. What's your name, please?

b) Do you have any hobbies? For example, Xiao Du likes singing, how about you?

c) What do you want Xiao Du to do for you? You can say, help me set the alarm clock, play music and so on.

At block S102, a corresponding spectrum of frequency domain feature is determined based on the voice message, and a signal processing is performed on the spectrum of frequency domain feature to obtain a first acoustic feature based on frame sequence and corresponding to the spectrum of frequency domain feature.

In an embodiment, before the corresponding spectrum of frequency domain feature is determined based on the voice message, the method further includes: performing a noise suppression and an effective speech detection on the voice message. For example, a pre-processing is performed on data sequences (PCM (Pulse Code Modulation) code stream) of the voice message, and the pre-processing includes the noise suppression and the effective speech detection, so as to remove non-speech signals and silence speech signals from the signals of the voice message, and then to divide the signals of the voice message into frames. In detail, by using mono, 8 bit and 16 KHz to sample, 256 sampling points as a frame unit (frame) and 128 as an overlap unit between frames, the input voice stream is divided to frames. In addition, a pre-enhanced processing of the voice message may also be included. In detail, $S_1(n)(n: 0 \ldots N-1)$ is taken as a time domain signal, and a byte differential is performed by a formula of $S(n)=S_1(n)-a \times S_1(n-1)$, in which, $0.9<a<1.0$.

Performing the signal processing on the spectrum of frequency domain feature to obtain the first acoustic feature based on frame sequence and corresponding to the spectrum of frequency domain feature includes: performing the signal processing on the spectrum of frequency domain feature and adding a time window, to obtain the first acoustic feature based on frame sequence and corresponding to the spectrum of frequency domain feature. For example, Hamming Windowing is added. It is assumed that the signals of the voice message are framed and processed as (M frames, total N nodes) $S(n)$, $n=0, 1, \ldots, N-1$. Then, after Hamming window is added, $$S'(n) = S(n) \times W(n)$$
$$W(n) = W(n, a) = 1 - a - a \cos\left(\frac{2\pi n}{N-1}\right)$$

$0<n<N-1$, a can be taken as 0.36. Then, the first acoustic feature is obtained by Fourier transform, discrete cosine transform and band-pass filter on the signals after the time window is added.

At block S103, a feature extraction is performed on the first acoustic feature to obtain a second acoustic feature based on an ivector algorithm and a deep convolutional neural network algorithm with residual processing, the second acoustic feature is converted into a voiceprint model corresponding to the user, and the voiceprint model is stored in a voiceprint model database.

The ivector can characterize the acoustic difference feature of the user (i.e., the speaker). The feature extraction based the ivector algorithm may include follows.

The first acoustic feature corresponding to I pieces of training data obtained based on the unordered version of language interaction is taken as the input, i.e. $y=\{Y_i|i=1, 2, 3, \ldots, I\}$, in which $Y_i$ is a D-dimensional feature vector taken from the $i^{th}$ training voice segment, a hybrid model is established by the deep convolutional neural network algorithm with residual processing, a voice segment $Y_i$ is given, the second acoustic feature is described and extracted by using a random super vector, and the voiceprint model corresponding to the user is obtained by recording each parameter (such as a peak parameter, a waveform parameter) of the second acoustic feature.

With the technical solutions provided by embodiments of the present disclosure, by receiving the voice message sent by the user, the voice message is obtained based on the unordered version of language interaction, the corresponding spectrum of frequency domain feature is determined based on the voice message, the signal processing is performed on the spectrum of frequency domain feature to obtain the first acoustic feature based on frame sequence and corresponding to the spectrum of frequency domain feature, the feature extraction is performed on the first acoustic feature to obtain the second acoustic feature based on the ivector algorithm and the deep convolutional neural network algorithm with residual processing, the second acoustic feature is converted into the voiceprint model corresponding to the user, and the voiceprint model is stored in the voiceprint model database, thereby improving the accuracy of the voiceprint recognition, simplifying the process of the voiceprint recognition, improving the operation efficiency of the terminal device, and reducing the energy consumption of the terminal device.

Figure 2:
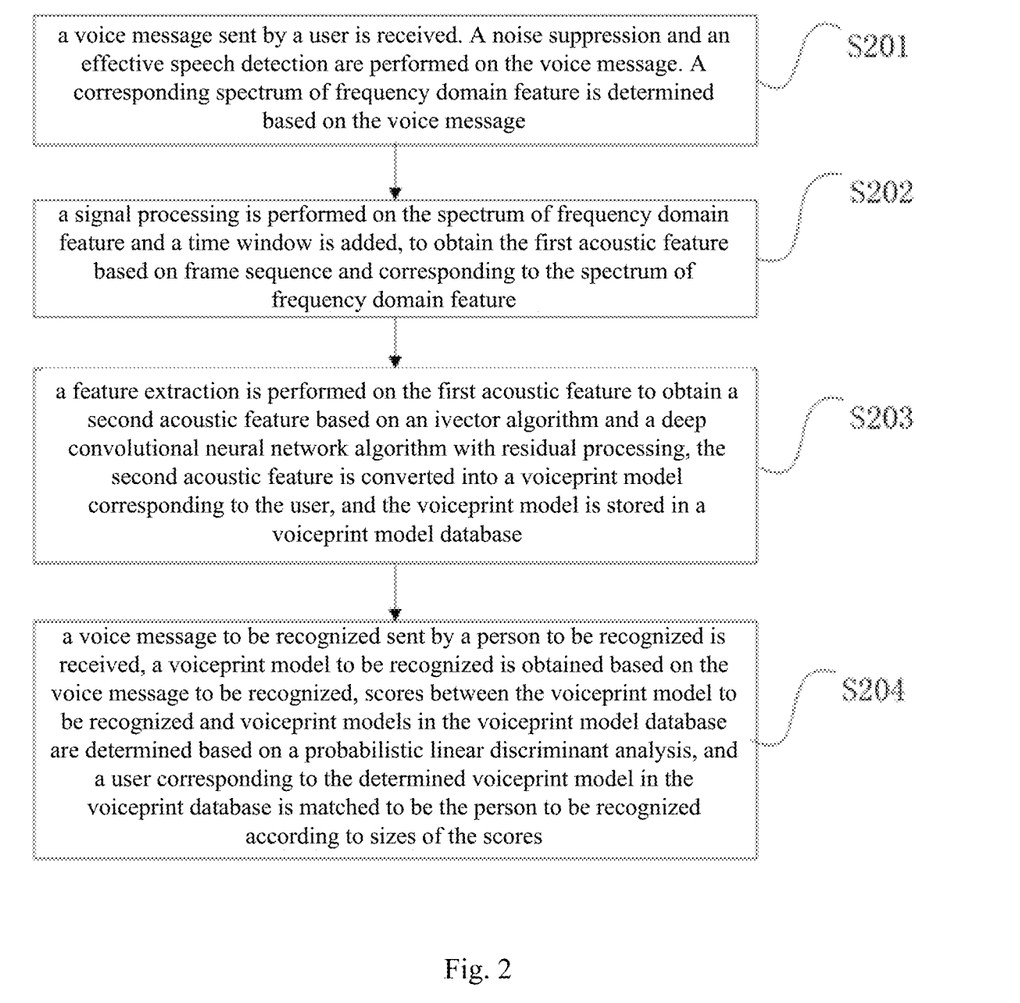
FIG. 2 is a flow chart of a method for processing a voice message according to another embodiment of the present disclosure.

FIG. 2 is a flow chart of a method for processing a voice message according to another embodiment of the present disclosure. Based on the above embodiments, in at least one embodiment, after the voiceprint model is stored in the voiceprint model database, the method further includes: receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

Thus, the voiceprint recognition is accurately realized. Based on the above optimization, as illustrated in FIG. 2, the technical solutions provided in this embodiment include follows.

At block S201, a voice message sent by a user is received. The voice message is obtained based on an unordered version of language interaction. A noise suppression and an effective speech detection are performed on the voice message. A corresponding spectrum of frequency domain feature is determined based on the voice message.

At block S202, a signal processing is performed on the spectrum of frequency domain feature and a time window is added, to obtain the first acoustic feature based on frame sequence and corresponding to the spectrum of frequency domain feature.

At block S203, a feature extraction is performed on the first acoustic feature to obtain a second acoustic feature based on an ivector algorithm and a deep convolutional neural network algorithm with residual processing, the second acoustic feature is converted into a voiceprint model corresponding to the user, and the voiceprint model is stored in a voiceprint model database.

At block S204, a voice message to be recognized sent by a person to be recognized is received, a voiceprint model to be recognized is obtained based on the voice message to be recognized, scores between the voiceprint model to be recognized and voiceprint models in the voiceprint model database are determined based on a probabilistic linear discriminant analysis, and a user corresponding to the determined voiceprint model in the voiceprint database is matched to be the person to be recognized according to sizes of the scores.

In an embodiment, a difference between the ivector feature of the voiceprint model to be recognized and the ivector feature of the voiceprint model in the voiceprint model database may be graded. The greater the score is, the smaller the difference is. The voiceprint model with the highest score is matched with the voiceprint model to be recognized, so as to determine the identity of the person to be recognized. In detail, the probabilistic linear discriminant analysis (PLDA) may include follows.

The parameters of the constructed PLDA model may have 4, which are a data mean miu, spatial eigenmatrixs F and G, and a noise covariance sigma. The training process of the model can be iteratively solved by a classical EM (Expectation Maximization) algorithm.

During a recognizing and testing phase, a likelihood of the voice message to be recognized and the voiceprint model in the voiceprint model database is calculated, and a final score can be obtained by using a log-likelihood ratio, which is denoted as follows:

$$\text{score} = \log \frac{p(\eta_1, \eta_2 \mid H_s)}{p(\eta_1 \mid H_d)p(\eta_2 \mid H_d)}.$$

It is assumed to be Hs when the voice to be recognized and a voice recorded in the voiceprint model database come from the same space, and it is assumed to be $H_d$ when the voice to be recognized and a voice recorded in the voiceprint model database come from different spaces. The score of the similarity between the two is obtained by calculating the log-likelihood ratio.

Figure 3:
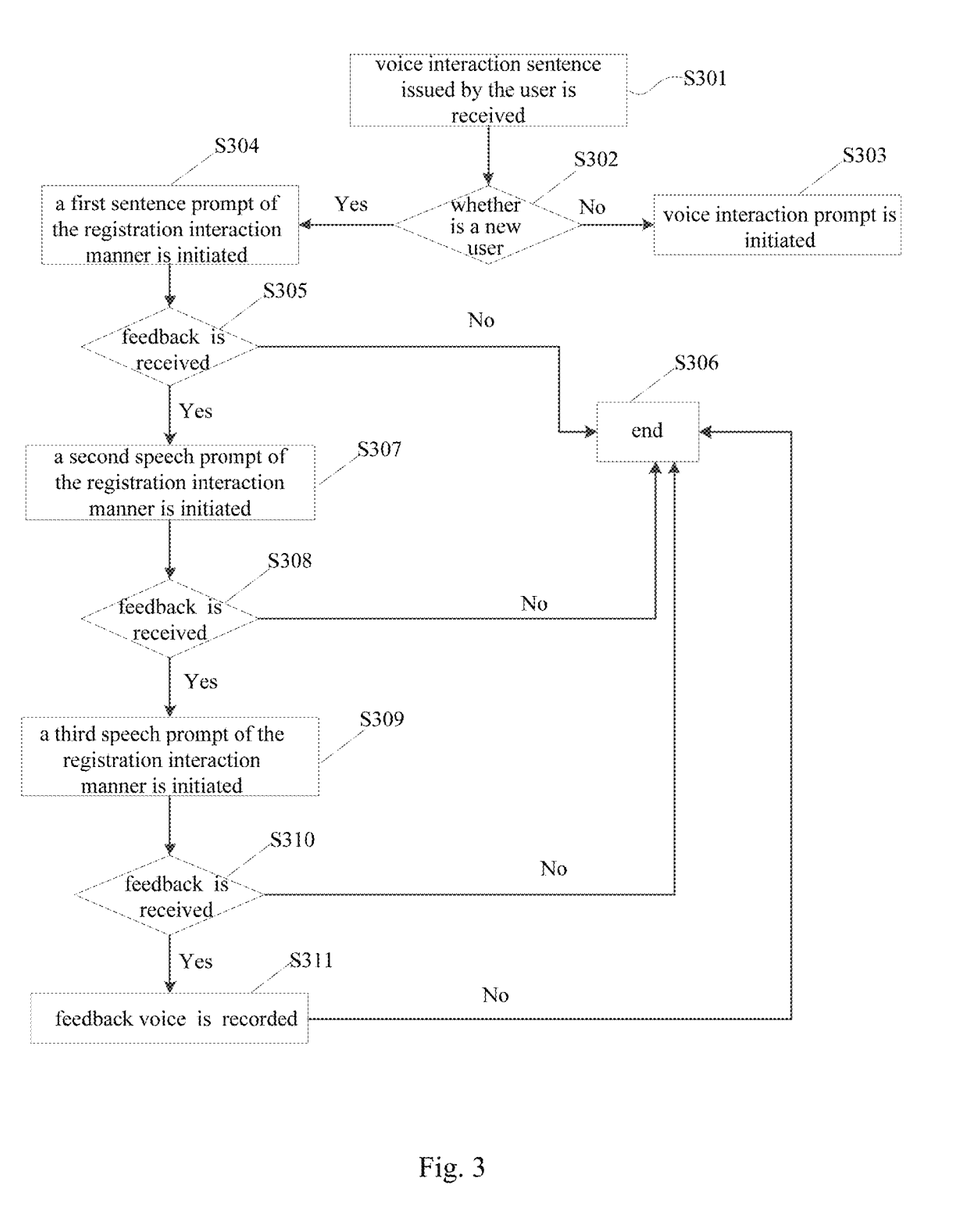
FIG. 3 is a flow chart of an interaction manner of a method for processing a voice message according to an embodiment of the present disclosure.

FIG. 3 is a flow chart of an interaction manner of a method for processing a voice message according to an embodiment of the present disclosure. As illustrated in FIG. 3, the method includes follows.

A voice interaction sentence issued by the user is received (S301), for example, "hi, Xiao Du Xiao Du". In this case, it is determined whether the user issuing the voice interaction is a new user (S302). When it is determined that the user is not the new user (the user is recognized and matched as Xiao Ming), a voice interaction prompt is initiated (303), for example, "Xiao Ming, what can I do for you?" When it is determined that the user is the new user, a first sentence prompt of the registration interaction manner is initiated (S304), for example, "hi, hello, I do not know you yet, what's your name?" It is determined whether a voice feedback from the user is received (S305). When no voice feedback from the user is detected within a preset time period (such as 10s), the interaction is ended (S306). When it is detected that the user feeds back the voice such as "I am Xiao Ming", the feedback voice is record, and a second voice prompt of the registration interaction manner is initiated (S307), for example, "Do you have any hobbies?" It is determined whether the speech feedback is received (S308). When no (S306), then the interaction is ended, and when yes (S309), the feedback voice is record. A third voice prompt of the registration interaction manner is initiated, for example, "What do you want Xiao Du to do for you?" It is determined whether the voice feedback is received (S310). When no (S306), the interaction is ended, and when yes (S311), the feedback voice from the user is received and recorded, for example, "please remember favorite song, and wake me up at 9:00 every morning", and the interaction is ended (S306).

In this embodiment, the voice interaction is performed in the sample non-text manner, and the voiceprint registration is achieved based on the method for processing the voice message provided in the foregoing embodiment, thereby improving the accuracy of the voiceprint recognition, simplifying the process of the voiceprint recognition, improving the operation efficiency of the terminal device, and reducing the energy consumption of the terminal device.

Figure 4:
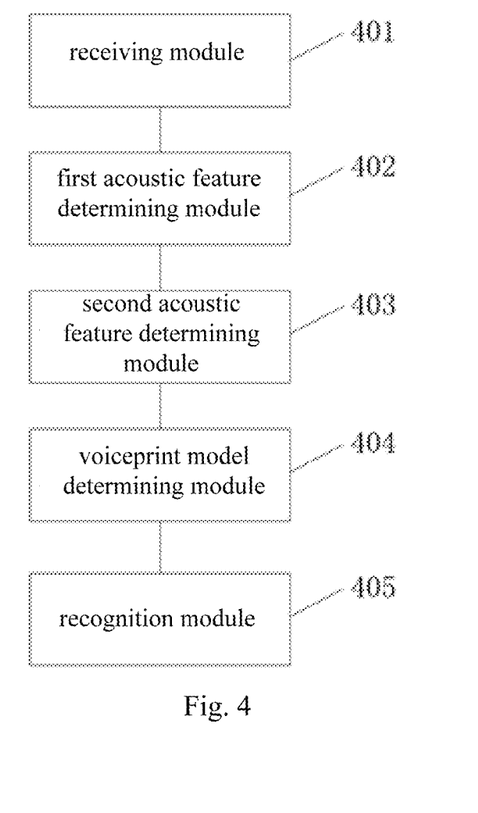
FIG. 4 is a block diagram of a voiceprint recognition device according to an embodiment of the present disclosure.

FIG. 4 is a block diagram of a voiceprint recognition device according to an embodiment of the present disclosure. The device is configured to perform the method for processing a voice message provided by the above embodiments, and includes corresponding modules configured to perform the method and has beneficial effects. As illustrated in FIG. 4, the device includes a receiving module 401, a first acoustic feature determining module 402, a second acoustic feature determining module 403 and a voiceprint model determining module 404.

The receiving module 401 is configured to receive a voice message sent by a user. The voice message is obtained based on an unordered version of language interaction.

The first acoustic feature determining module 402 is configured to determine a corresponding spectrum of frequency domain feature based on the voice message, and to perform a signal processing on the spectrum of frequency domain feature to obtain a first acoustic feature based on frame sequence and corresponding to the spectrum of frequency domain feature.

The second acoustic feature determining module 403 is configured to perform a feature extraction on the first acoustic feature to obtain a second acoustic feature based on an ivector algorithm and a deep convolutional neural network algorithm with residual processing.

The voiceprint model determining module 404 is configured to convert the second acoustic feature into a voiceprint model corresponding to the user, and to store the voiceprint model in a voiceprint model database.

With the technical solutions provided by embodiments of the present disclosure, by receiving the voice message sent by the user, the voice message is obtained based on the unordered version of language interaction, the corresponding spectrum of frequency domain feature is determined based on the voice message, the signal processing is performed on the spectrum of frequency domain feature to obtain the first acoustic feature based on frame sequence and corresponding to the spectrum of frequency domain feature, the feature extraction is performed on the first acoustic feature to obtain the second acoustic feature based on the ivector algorithm and the deep convolutional neural network algorithm with residual processing, the second acoustic feature is converted into the voiceprint model corresponding to the user, and the voiceprint model is stored in the voiceprint model database, thereby improving the accuracy of the voiceprint recognition, simplifying the process of the voiceprint recognition, improving the operation efficiency of the terminal device, and reducing the energy consumption of the terminal device.

Based on the above technical solutions, the second acoustic feature determining module 402 is configured to perform a noise suppression and an effective speech detection on the voice message.

Based on the above technical solutions, the first acoustic feature determining module 402 is configured to perform the signal processing on the spectrum of frequency domain feature and add a time window, to obtain the first acoustic feature based on frame sequence and corresponding to the spectrum of frequency domain feature.

Based on the above technical solutions, the device further includes a recognition module 405.

The recognition module 405 is configured to: receive a voice message to be recognized sent by a person to be recognized, obtain a voiceprint model to be recognized based on the voice message to be recognized, determine scores between the voiceprint model to be recognized and voiceprint models in the voiceprint model database based on a probabilistic linear discriminant analysis, and match a user corresponding to the determined voiceprint model in the voiceprint database to be the person to be recognized according to sizes of the scores.

Figure 5:
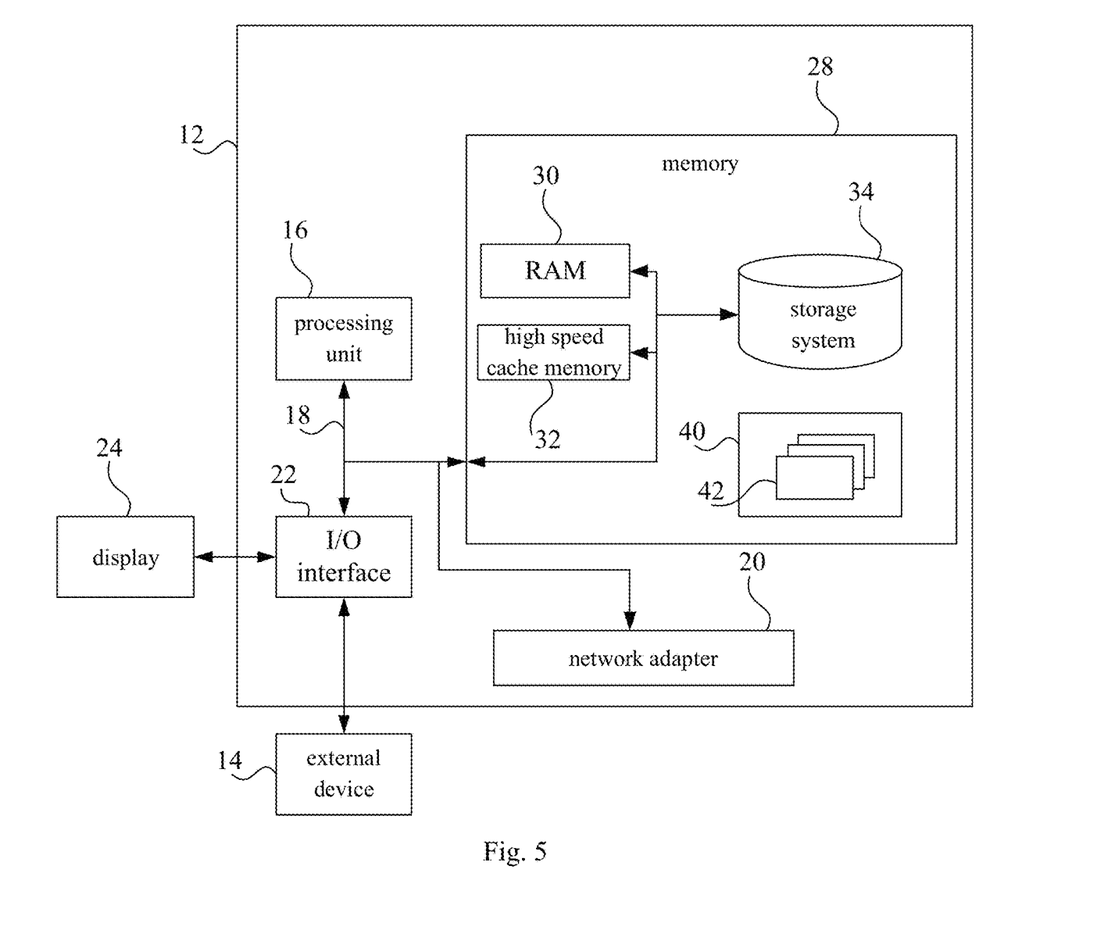
FIG. 5 is a block diagram of a terminal according to an embodiment of the present disclosure.

FIG. 5 is a block diagram illustrating a terminal according to an embodiment of the present disclosure. FIG. 5 illustrates a block diagram of an exemplary terminal 12 suitable for realizing implementations of the present disclosure. The terminal 12 illustrated in FIG. 5 is merely an example, which should be not understood to limit the functions and usage scope of embodiments of the present disclosure.

As illustrated in FIG. 5, the terminal 12 may be represented via a general computer device form. Components of the terminal 12 may include but be not limited to one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The terminal 12 typically includes a variety of computer system readable media. These media may be any available media accessible by the terminal 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The terminal 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The terminal 12 may also communicate with one or more external devices 14 (such as, a keyboard, a pointing device, a display 24, etc.). Furthermore, the terminal 12 may also communicate with one or more communication devices enabling a user to interact with the terminal 12 and/or other devices (such as a network card, modem, etc.) enabling the terminal 12 to communicate with one or more computer devices. This communication can be performed via the input/output (I/O) interface 22. Also, the terminal 12 may communicate with one or more networks (such as a local area network (hereafter referred to as LAN), a wide area network (hereafter referred to as WAN) and/or a public network such as an Internet) through a network adapter 20. As shown in FIG. 5, the network adapter 20 communicates with other modules of the terminal 12 over the bus 18. It should be understood that, although not shown in FIG. 5, other hardware and/or software modules may be used in connection with the terminal 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method for processing a voice message provided in embodiments of the present disclosure.

Embodiments of the present disclosure further provide a storage medium including computer executable instructions. When the computer executable instructions are executed by a computer processor, a method for processing a voice message is executed. The method includes receiving a voice message sent by a user, the voice message being obtained based on an unordered version of language interaction; determining a corresponding spectrum of frequency domain feature based on the voice message, and performing a signal processing on the spectrum of frequency domain feature to obtain a first acoustic feature based on frame sequence and corresponding to the spectrum of frequency domain feature; and performing a feature extraction on the first acoustic feature to obtain a second acoustic feature based on an ivector algorithm and a deep convolutional neural network algorithm with residual processing, converting the second acoustic feature into a voiceprint model corresponding to the user, and storing the voiceprint model in a voiceprint model database.

In at least one embodiment, before determining the corresponding spectrum of frequency domain feature based on the voice message, the method further includes: performing a noise suppression and an effective speech detection on the voice message.

In at least one embodiment, performing the signal processing on the spectrum of frequency domain feature to obtain the first acoustic feature based on frame sequence corresponding to the spectrum of frequency domain feature includes: performing the signal processing on the spectrum of frequency domain feature and adding a time window, to obtain the first acoustic feature based on frame sequence and corresponding to the spectrum of frequency domain feature.

In at least one embodiment, after storing the voiceprint model in the voiceprint model database, the method further includes: receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

The storage medium provided by embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for processing a voice message, comprising:
receiving a voice message sent by a user, the voice message being obtained based on an unordered version of language interaction;
determining a corresponding spectrum of frequency domain feature based on the voice message, and performing a signal processing on the spectrum of frequency domain feature to obtain a first acoustic feature based on frame sequence and corresponding to the spectrum of frequency domain feature; and
performing a feature extraction on the first acoustic feature to obtain a second acoustic feature based on an ivector algorithm and a deep convolutional neural network algorithm with residual processing, converting the second acoustic feature into a voiceprint model corresponding to the user, and storing the voiceprint model in a voiceprint model database.

2. The method according to claim 1, before determining the corresponding spectrum of frequency domain feature based on the voice message, further comprising:
performing a noise suppression and an effective speech detection on the voice message.

3. The method according to claim 2, after storing the voiceprint model in the voiceprint model database, further comprising:
receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

4. The method according to claim 1, before determining the corresponding spectrum of frequency domain feature based on the voice message, further comprising:
performing a pre-enhanced processing on the voice message.

5. The method according to claim 4, after storing the voiceprint model in the voiceprint model database, further comprising:
receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

6. The method according to claim 1, wherein performing the signal processing on the spectrum of frequency domain feature to obtain the first acoustic feature based on frame sequence and corresponding to the spectrum of frequency domain feature comprises:
performing the signal processing on the spectrum of frequency domain feature and adding a time window, to obtain the first acoustic feature based on frame sequence and corresponding to the spectrum of frequency domain feature.

7. The method according to claim 6, after storing the voiceprint model in the voiceprint model database, further comprising:
receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

8. The method according to claim 1, after storing the voiceprint model in the voiceprint model database, further comprising:
   receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

9. The method according to claim 8, wherein the score is presented by a log-likelihood ratio between the voiceprint model to be recognized and voiceprint models in the voiceprint model database.

10. A terminal, comprising:
    one or more processors;
    a storage device, configured to store one or more programs;
    wherein the one or more processors is configured to read the one or more programs from the storage device to perform acts of:
    receiving a voice message sent by a user, the voice message being obtained based on an unordered version of language interaction;
    determining a corresponding spectrum of frequency domain feature based on the voice message, and performing a signal processing on the spectrum of frequency domain feature to obtain a first acoustic feature based on frame sequence and corresponding to the spectrum of frequency domain feature; and
    performing a feature extraction on the first acoustic feature to obtain a second acoustic feature based on an ivector algorithm and a deep convolutional neural network algorithm with residual processing, converting the second acoustic feature into a voiceprint model corresponding to the user, and storing the voiceprint model in a voiceprint model database.

11. The terminal according to claim 10, wherein the one or more processors is further configured to perform acts of:
    performing a noise suppression and an effective speech detection on the voice message.

12. The terminal according to claim 10, wherein the one or more processors is further configured to perform acts of:
    performing a pre-enhanced processing on the voice message.

13. The terminal according to claim 10, wherein the one or more processors is configured to perform the signal processing on the spectrum of frequency domain feature to obtain the first acoustic feature based on frame sequence and corresponding to the spectrum of frequency domain feature by an act of:
    performing the signal processing on the spectrum of frequency domain feature and adding a time window, to obtain the first acoustic feature based on frame sequence and corresponding to the spectrum of frequency domain feature.

14. The terminal according to claim 10, wherein the one or more processors is further configured to perform acts of:
    receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

15. The terminal according to claim 14, wherein the score is presented by a log-likelihood ratio between the voiceprint model to be recognized and voiceprint models in the voiceprint model database.

16. A non-transitory computer readable storage medium comprising computer executable instructions, wherein when the computer executable instructions are executed by a computer processor, a method for processing voice message is performed, the method comprises:
    receiving voice message sent by a user, the voice message being obtained based on an unordered version of language interaction;
    determining a corresponding spectrum of frequency domain feature based on the voice message, and performing a signal processing on the spectrum of frequency domain feature to obtain a first acoustic feature based on frame sequence and corresponding to the spectrum of frequency domain feature; and
    performing a feature extraction on the first acoustic feature to obtain a second acoustic feature based on an ivector algorithm and a deep convolutional neural network algorithm with residual processing, converting the second acoustic feature into a voiceprint model corresponding to the user, and storing the voiceprint model in a voiceprint model database.

17. The non-transitory computer readable storage medium according to claim 16, wherein the method further comprises:
    before determining the corresponding spectrum of frequency domain feature based on the voice message, performing a noise suppression and an effective speech detection on the voice message.

18. The non-transitory computer readable storage medium according to claim 16, wherein the method further comprises:
    before determining the corresponding spectrum of frequency domain feature based on the voice message, performing a pre-enhanced processing on the voice message.

19. The non-transitory computer readable storage medium according to claim 16, wherein performing the signal processing on the spectrum of frequency domain feature to obtain the first acoustic feature based on frame sequence and corresponding to the spectrum of frequency domain feature comprises:
    performing the signal processing on the spectrum of frequency domain feature and adding a time window, to obtain the first acoustic feature based on frame sequence and corresponding to the spectrum of frequency domain feature.

20. The non-transitory computer readable storage medium according to claim 16, wherein the method further comprises:
    receiving a voice message to be recognized sent by a person to be recognized, obtaining a voiceprint model to be recognized based on the voice message to be recognized, determining scores between the voiceprint model to be recognized and voiceprint models in the voiceprint model database based on a probabilistic linear discriminant analysis, and matching a user corresponding to the determined voiceprint model in the voiceprint database to be the person to be recognized according to sizes of the scores.

* * * * *